(12) United States Patent
Fujita

(10) Patent No.: US 8,845,799 B2
(45) Date of Patent: *Sep. 30, 2014

(54) REVERSIBLY THERMOCHROMIC AQUEOUS INK COMPOSITION, AND WRITING INSTRUMENT AND WRITING INSTRUMENT SET EACH UTILIZING SAME

(75) Inventor: Katsuyuki Fujita, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 258 days.

This patent is subject to a terminal disclaimer.

(21) Appl. No.: 13/390,550

(22) PCT Filed: Aug. 16, 2010

(86) PCT No.: PCT/JP2010/063835
§ 371 (c)(1),
(2), (4) Date: Feb. 15, 2012

(87) PCT Pub. No.: WO2011/021610
PCT Pub. Date: Feb. 24, 2011

(65) Prior Publication Data
US 2012/0141188 A1    Jun. 7, 2012

(30) Foreign Application Priority Data
Aug. 18, 2009   (JP) .................................. 2009-189038

(51) Int. Cl.
| | | |
|---|---|---|
| *C09D 11/16* | (2014.01) | |
| *C09D 11/00* | (2014.01) | |
| *B43K 8/04* | (2006.01) | |
| *B43L 19/00* | (2006.01) | |
| *B43K 8/02* | (2006.01) | |
| *B43K 23/12* | (2006.01) | |
| *C09B 67/10* | (2006.01) | |
| *C09B 67/46* | (2006.01) | |
| *B43K 25/02* | (2006.01) | |
| *C09D 5/26* | (2006.01) | |
| *C09B 67/02* | (2006.01) | |
| *B43K 8/03* | (2006.01) | |
| *C09D 7/12* | (2006.01) | |
| *C09D 11/17* | (2014.01) | |
| *B43K 29/02* | (2006.01) | |
| *B41M 5/30* | (2006.01) | |

(52) U.S. Cl.
CPC . *C09D 11/17* (2013.01); *B43K 8/04* (2013.01); *B43L 19/0068* (2013.01); *B43K 8/02* (2013.01); *B43K 23/126* (2013.01); *C09B 67/0014* (2013.01); *C09B 67/009* (2013.01); *B43K 25/022* (2013.01); *C09D 5/26* (2013.01); *C09B 67/0097* (2013.01); *B43K 8/03* (2013.01); *B41M 5/305* (2013.01); *C09B 67/0085* (2013.01); *C09D 7/1291* (2013.01); *B43K 29/02* (2013.01)
USPC .................... 106/31.32; 106/31.64; 106/31.16

(58) Field of Classification Search
CPC ......... C09D 11/17; C09D 11/50; B41M 5/30; B41M 5/305; B41M 5/377
USPC ................................ 106/31.32, 31.64, 31.16
See application file for complete search history.

(56) References Cited

U.S. PATENT DOCUMENTS

| | | | | |
|---|---|---|---|---|
| 5,527,385 | A * | 6/1996 | Sumii et al. ................. | 106/31.17 |
| 8,529,683 | B2 * | 9/2013 | Fujita .......................... | 106/31.32 |
| 2006/0112851 | A1 | 6/2006 | Ono et al. | |
| 2007/0189836 | A1 | 8/2007 | Senga et al. | |
| 2008/0124164 | A1 * | 5/2008 | Ito et al. ......................... | 401/195 |
| 2011/0008095 | A1 | 1/2011 | Fujita | |

FOREIGN PATENT DOCUMENTS

| | | |
|---|---|---|
| EP | 1 657 073 A2 | 5/2006 |
| EP | 1 820 662 A2 | 8/2007 |
| JP | 51-44706 | 11/1976 |
| JP | 51-44707 | 11/1976 |
| JP | 1-29398 B2 | 6/1989 |
| JP | 4-17154 B2 | 3/1992 |
| JP | 7-33997 A | 2/1995 |
| JP | 7-179777 A | 7/1995 |
| JP | 8-39936 A | 2/1996 |
| JP | 11-335613 A | 12/1999 |
| JP | 2005-336215 A | 12/2005 |
| JP | 2006-123324 A | 5/2006 |
| JP | 2006-298990 A | 11/2006 |
| JP | 2008-101098 A | 5/2008 |

OTHER PUBLICATIONS

International Search Report for PCT/JP2010/063835, mailed Sep. 14, 2010.

Extended European Search Report issued with respect to European Application No. 10809951.6, mail date is Jan. 29, 2014.

\* cited by examiner

*Primary Examiner* — Veronica F Faison

(74) *Attorney, Agent, or Firm* — Greenblum & Bernstein, P.L.C.

(57) ABSTRACT

The present invention relates to a reversibly thermochromic aqueous ink composition comprising: water; a water-soluble organic solvent; a reversibly thermochromic microcapsule pigment which contains a reversibly thermochromic composition comprising: (A) an electron donating coloring organic compound, (B) an electron accepting compound, and (C) a reaction medium which determines temperature at which color reactions between the components (A) and (B) occur; a comb type polymer dispersant having carboxyl groups on its side chains, an organic nitrogen sulfur compound, and a water-soluble resin, a writing instrument using the ink composition, and a writing instrument set comprising the writing instrument and a frictional body.

11 Claims, 5 Drawing Sheets

REVERSIBLY THERMOCHROMIC AQUEOUS INK COMPOSITION, AND WRITING INSTRUMENT AND WRITING INSTRUMENT SET EACH UTILIZING SAME

TECHNICAL FIELD

The present invention relates to a reversibly thermochromic aqueous ink composition, and a writing instrument and a writing instrument set each utilizing the same.

BACKGROUND ART

Hitherto, there is disclosed an inner-wadding type writing instrument wherein an ink occlusion body is impregnated with a reversibly thermochromic aqueous ink composition capable of forming handwriting whose color tone changes depending on a change in temperature and is received in an axle body (see, e.g., Patent Document 1).

The above reversibly thermochromic aqueous ink composition solves a problem that a reversibly thermochromic microcapsule pigment is gradually flocculated and precipitated in the ink occlusion body owing to a difference in specific gravity between the reversibly thermochromic microcapsule pigment and a vehicle and hence handwriting is lightened or deepened in color depending on the state where a pen body is downward (an inverted state) or upward (an erecting state). Specifically, it solves the problem by incorporating a water-soluble polymer flocculant into the ink to make the microcapsule pigment suspended in a loose flocculated state through a loose crosslinking action of the polymer flocculant.

However, although it is possible to suppress the flocculation and sedimentation of the microcapsule pigment for a short period of time by incorporating the polymer flocculant, it is difficult to completely suppress the lightening and deepening in color of handwriting attributable to the difference in specific gravity between the microcapsule pigment and the vehicle. Particularly, handwriting is sometimes lightened with time in an erecting state or handwriting is sometimes lightened by the application of vibration at transportation or at the time when it is carried on in an erecting state.

BACKGROUND ART DOCUMENT

Patent Document

[Patent Document 1] JP-A-11-335613

SUMMARY OF THE INVENTION

Problems that the Invention is to Solve

The present invention provides a reversibly thermochromic aqueous ink composition which is capable of suppressing the lightening and deepening of handwriting at the time when a writing instrument receiving the reversibly thermochromic aqueous ink composition in the axle body is used, and particularly, which does not lighten the color of handwriting with time in an erecting state or does not lighten the color of handwriting by the application of vibration at transportation or at the time when it is carried on in an erecting state, as well as a writing instrument and writing instrument set using the same.

Means for Solving the Problems

The present invention intends to solve the above problems of the conventional reversibly thermochromic aqueous ink composition and writing instrument using the same, and, that is, provides a reversibly thermochromic aqueous ink composition comprising: water; a water-soluble organic solvent; a reversibly thermochromic microcapsule pigment which contains a reversibly thermochromic composition comprising: (A) an electron donating coloring organic compound, (B) an electron accepting compound, and (C) a reaction medium which determines temperature at which color reactions between the components (A) and (B) occur; a comb type polymer dispersant having carboxyl groups on its side chains; an organic nitrogen sulfur compound; and a water-soluble resin.

Further, it is preferred that the organic nitrogen sulfur compound is at least one compound selected from the group consisting of 2-(4-thiazoyl)-benzimidazole, 2-(thiocyanate-methylthio)-1,3-benzothiazole, 2-methyl-4-isothiazolin-3-one, 5-chloro-2-methyl-4-isothiazolin-3-one, that the mass ratio of the comb type polymer dispersant having carboxyl groups on its side chains to the organic nitrogen sulfur compound is 1:1 to 1:10, that the pH of the ink composition falls within a range of 3 to 7, that the water-soluble resin is soluble when the pH of the ink composition falls within a range of 3 to 7, that the surface tension of the ink composition falls within a range of 25 to 45 mN/m, and the like.

Moreover, the present invention provides a writing instrument wherein the reversibly thermochromic aqueous ink composition is received in an axle body and which comprises a pen body delivering the ink composition in the axle body.

Also, it is preferred that the rear end of the pen body comes into contact with an ink occlusion body containing a fiber assembly received in the axle body and the ink occlusion body is impregnated with the ink composition, that the pen body is a marking pen body, that a frictional member is provided, and the like.

Furthermore, the present invention provides a writing instrument set comprising the writing instrument and a frictional body.

Effects of the Invention

The present invention can provide a reversibly thermochromic aqueous ink composition which is capable of suppressing the lightening and deepening of handwriting and particularly, which has a excellent writing performance of causing no lightening the color of handwriting with time in an erecting state or no lightening the color of handwriting by the application of vibration at transportation or at the time when it is carried, as well as a writing instrument and writing instrument set using the same.

EMBODIMENTS FOR CARRYING OUT THE INVENTION

First, a hysteresis characteristic in a color density-temperature curve of the reversibly thermochromic composition will be described.

Figure 2:
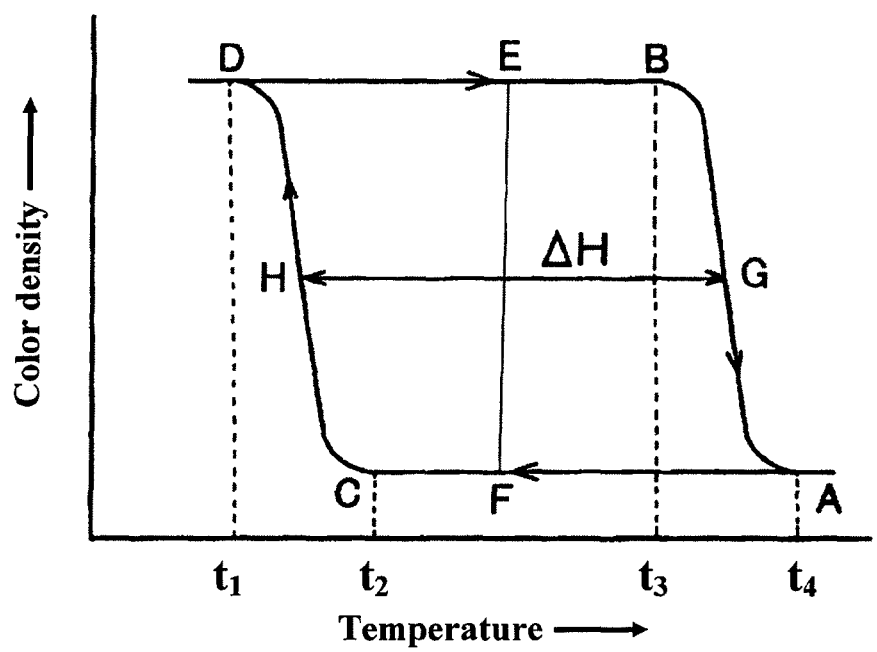
FIG. 2 is an illustrative drawing showing a discoloration behavior of a heat-decoloring type reversibly thermochromic microcapsule pigments having a color-memory property.

In FIG. 2, the color density is plotted on the ordinate and the temperature is plotted on the abscissa. A change in the color density due to a temperature change progresses along the arrow. Here, A is a point showing the density at a temperature $t_4$ at which a completely decolored state is achieved (hereinafter, referred to as "complete decoloring temperature"); B is a point showing the density at a temperature $t_3$ at which decoloring starts (hereinafter, referred to as "decoloring starting temperature"); C is a point showing the density at a temperature $t_2$ at which coloring starts (hereinafter, referred to as "coloring starting temperature"); and D is a point showing the density at a temperature $t_1$ at which a completely colored state is achieved (hereinafter, referred to as "complete coloring temperature").

The discoloration temperature region is a temperature region between the aforementioned $t_1$ and $t_4$ wherein both phases of the colored state and decolored state can coexist, and the temperature region between $t_2$ and $t_3$ which has a large difference in the color density is a substantial two phase retention temperature region.

Further, the length of the line segment EF is a measure showing contrast of discoloration, and the hysteresis width passing through a middle point of the line segment EF (the length of the line segment HG in FIG. 2) is a temperature width showing the degree of hysteresis (hereinafter, referred to as "hysteresis width ΔH"). A small ΔH value allows the presence of only one specified state of the both states before and after discoloration in an ordinary temperature region. A large ΔH value facilitates retention of each state before or after discoloration.

The coloring agent contained in the above ink composition of the present invention is a microcapsule pigment containing in a microcapsule a reversibly thermochromic composition which is decolored by heating and contains at least essential three components of (A) an electron donating coloring organic compound, (B) an electron accepting compound and (C) a reaction medium which determines a temperature at which color reactions between the components (A) and (B) occur.

Figure 1:
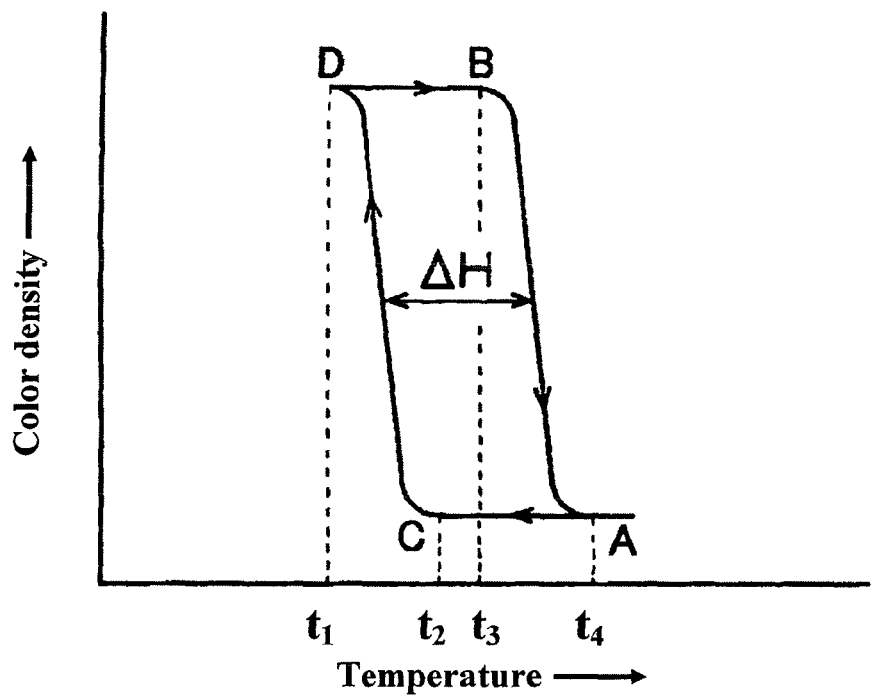
FIG. 1 is an illustrative drawing showing a discoloration behavior of a heat-decoloring type reversibly thermochromic microcapsule pigments.

As the reversibly thermochromic composition, there may be mentioned reversibly thermochromic compositions described in JP-B-51-44706, JP-B-51-44707, JP-B-1-29398, and the like. Each of these reversibly thermochromic compositions discolor with a predetermined temperature (discoloration point) as a border; it shows a decolored state in a temperature region equal to or higher than the discoloration point at a high temperature side and a colored state in a temperature region equal to or lower than the discoloration point at a low temperature side; only one specified state of the both states as mentioned above exists in an ordinary temperature region and the other state is maintained while a heat or cold necessary for expressing the state is applied but returns to the state shown in the ordinary temperature range when application of the heat or cold is removed; it has a property that a hysteresis width is relatively small (ΔH=1 to 7° C.) (see FIG. 1).

Moreover, there can be applied a microcapsule pigment which shows a large hysteresis characteristic (ΔH$_B$=8 to 50° C.), as described in JP-B-4-17154, JP-A-7-179777, JP-A-7-33997, JP-A-8-39936 and the like, namely, a heat-decoloring type microcapsule pigments containing, in a microcapsule, a reversibly thermochromic composition which discolors tracing a route in which the shape of a curve plotting a change in color density with a temperature change is largely different between the case where the temperature is elevated from a low temperature side of the discoloration temperature region and the case where the temperature is lowered from a high temperature side of the discoloration temperature region in reverse, and which has a color-memory property of a colored state in a low temperature region equal to or lower than the complete coloring temperature ($t_1$) or a decolored state in a high temperature region equal to or higher than the complete decoloring temperature ($t_4$) in a specified temperature region [a temperature region between $t_2$ and $t_3$ (a substantial two phase retention temperature region)] (see FIG. 2).

The above reversibly thermochromic composition having a color-memory property specifically can be effectively functioned for the retention of color shown at an ordinary state (daily life temperature region) by specifying the complete coloring temperature $t_1$ to a temperature obtained only in a freezer, a cold district, and the like, i.e., a range of −50 to 0° C., preferably −40 to −5° C., and more preferably −30 to −10° C. and the complete decoloring temperature $t_4$ to a temperature obtained from frictional heat generated with a frictional body or a familiar heating body such as a hair dryer, i.e., a range 2 0 of 45 to 95° C., preferably 50 to 90° C., and more preferably 60 to 80° C. and specifying the ΔH value to 40 to 100° C.

Compounds of each component of the components (A), (B) and (C) will be exemplified below specifically.

As an electron donating coloring organic compound that is the component (A) of the present invention, there may be mentioned diphenylmethane phthalides, phenylindolyl phthalides, indolyl phthalides, diphenylmethane azaphthalides, phenylindolyl azaphthalides, fluorans, styrylquinolines, diazarhodamine lactones, and the like.

Examples of these compounds are shown below.

There can be mentioned: 3,3-bis(p-dimethylaminophenyl)-6-dimethylaminophthalide;
3-(4-diethylaminophenyl)-3-(1-ethyl-2-methylindol-3-yl)phthalide;
3,3-bis(1-n-butyl-2-methylindol-3-yl)phthalide;
3,3-bis(2-ethoxy-4-diethylaminophenyl)-4-azaphthalide;
3-[2-ethoxy-4-(N-ethylanilino)phenyl]-3-(1-ethyl-2-methylindol-3-yl)-4-azaphthalide;
3,6-diphenylaminofluoran;
3,6-dimethoxyfluoran;
3,6-di-n-butoxyfluoran;
2-methyl-6-(N-ethyl-N-p-tolylamino)fluoran;
3-chloro-6-cyclohexylaminofluoran;
2-methyl-6-cyclohexylaminofluoran;
2-(2-chloroamino)-6-dibutylaminofluoran;
2-(2-chloroanilino)-6-di-n-butylaminofluoran;
2-(3-trifluoromethylanilino)-6-diethylaminofluoran;
2-(N-methylanilino)-6-(N-ethyl-N-p-tolylamino)fluoran;
1,3-dimethyl-6-diethylaminofluoran;
2-chloro-3-methyl-6-diethylaminofluoran;
2-anilino-3-methyl-6-diethylaminofluoran;
2-anilino-3-methyl-6-di-n-butylaminofluoran;
2-xylidino-3-methyl-6-diethylaminofluoran;
1,2-benz-6-diethylaminofluoran;
1,2-benz-6-(N-ethyl-N-isobutylamino)fluoran;
1,2-benz-6-(N-ethyl-N-isoamylamino)fluoran;
2-(3-methoxy-4-dodecoxystyryl)quinoline;
spiro[5H-(1)benzopyrano(2,3-d)pyrimidine-5,1'(3'H)isobenzofuran]-3'-one;

2-(diethylamino)-8-(diethylamino)-4-methyl-spiro[5H-(1)benzopyrano(2,3-g)pyrimidine-5,1'(3'H)isobenzofuran]-3-one;

2-(di-n-butylamino)-8-(di-n-butylamino)-4-methyl-spiro[5H-(1)benzopyrano(2,3-g)pyrimidine-5,1'(3'H)isobenzofuran]-3-one;

2-(di-n-butylamino)-8-(diethylamino)-4-methyl-spiro[5H-(1)benzopyrano(2,3-g)pyrimidine-5,1'(3'H)isobenzofuran]-3-one;

2-(di-n-butylamino)-8-(N-ethyl-N-i-amylamino)-4-methyl-spiro[5H-(1)benzopyrano(2,3-g)pyrimidine-5,1'(3'H)isobenzofuran]-3-one;

2-(dibutylamino)-8-(dipentylamino)-4-methyl-spiro[5H-(1)-benzopyrano(2,3-g)pyrimidine-5,1'(3'H)-isobenzofuran]-3-one;

3-(2-methoxy-4-dimethylaminophenyl)-3-(1-butyl-2-methylindol-3-yl)-4,5,6,7-tetrachlorophthalide;

3-(2-ethoxy-4-diethylaminophenyl)-3-(1-ethyl-2-methylindol-3-yl)-4,5,6,7-tetrachlorophthalide;

3-(2-ethoxy-4-diethylaminophenyl)-3-(1-pentyl-2-methylindol-3-yl)-4,5,6,7-tetrachlorophthalide;

4,5,6,7-tetrachloro-3-[4-(dimethylamino)-2-methylphenyl]-3-(1-ethyl-2-methyl-1H-indol-3-yl)-1(3H)-isobenzofuran;

3',6'-bis[phenyl(2-methylphenyl)amino]-spiro[isobenzofurane-1(3H),9'-[9H]xanthen]-3-one;

3',6'-bis[phenyl(3-methylphenyl)amino]-spiro[isobenzofurane-1(3H),9'-[9H]xanthen-3-one; and 3',6'-bis[phenyl(3-ethylphenyl)amino]-spiro[isobenzofurane-1(3H),9'-[9H]xanthen]-3-one.

Additionally, pyridines, quinazolines and bisquinazolines compounds, which are effective for producing fluorescent yellow to red colors, are mentioned and 4-[2,6-bis(2-ethoxyphenyl)-4-pyridinyl]-N,N-dimethylbenzene amine can be exemplified.

As the electron accepting compound of the component (B) of the present invention, there may be mentioned a group of compounds having an active proton, a group of pseudo-acidic compounds (a group of compounds which are not acid but acting as acid in the composition to cause color development of the component (A)), a group of compounds having electron voids and the like.

Examples of the compounds having an active proton include monophenols and polyphenols as compounds having a phenolic hydroxyl group, those further having a substituent such as an alkyl group, an aryl group, an acyl group, an alkoxycarbonyl group, a carboxy group and an ester or amide thereof, or a halogen group, and bis- or trisphenols, and phenol-aldehyde condensed resins. In addition, the compounds may be metal salts of the above-described compounds having a phenolic hydroxyl group.

The specific examples are shown below:

There may be mentioned phenol, o-cresol, tertiary-butylcatechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 2,2-bis(4-hydroxyphenyl)propane, 4,4-dihydroxydiphenylsulfone, 1,1-bis(4-hydroxyphenyl)ethane, 2,2-bis(4-hydroxy-3-methylphenyl)propane, bis(4-hydroxyphenyl)sulfide, 1-phenyl-1,1-bis(4-hydroxyphenyl)ethane, 1,1-bis(4-hydroxyphenyl)-3-methylbutane, 1,1-bis(4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 1,1-bis(4-hydroxyphenyl)-2-ethylhexane, 2,2-bis(4-hydroxyphenyl)butane, 2,2-bis(4-hydroxyphenyl)ethyl propionate, 2,2-bis(4-hydroxyphenyl)-4-methylpentane, 2,2-bis(4-hydroxyphenyl)hexafluoropropane, 2,2-bis(4-hydroxyphenyl)-n-heptane and 2,2-bis(4-hydroxyphenyl)-n-nonane.

Although the above-described compound having a phenolic hydroxyl group can exhibit most effective thermal discoloration characteristics, a compound selected from aromatic carboxylic acids, aliphatic carboxylic acids having from 2 to 5 carbon atoms, carboxylic acid metal salts, acidic phosphoric acid esters and metal salts thereof, and 1,2,3-triazole and derivatives thereof, and the like may be used.

Figure 3:
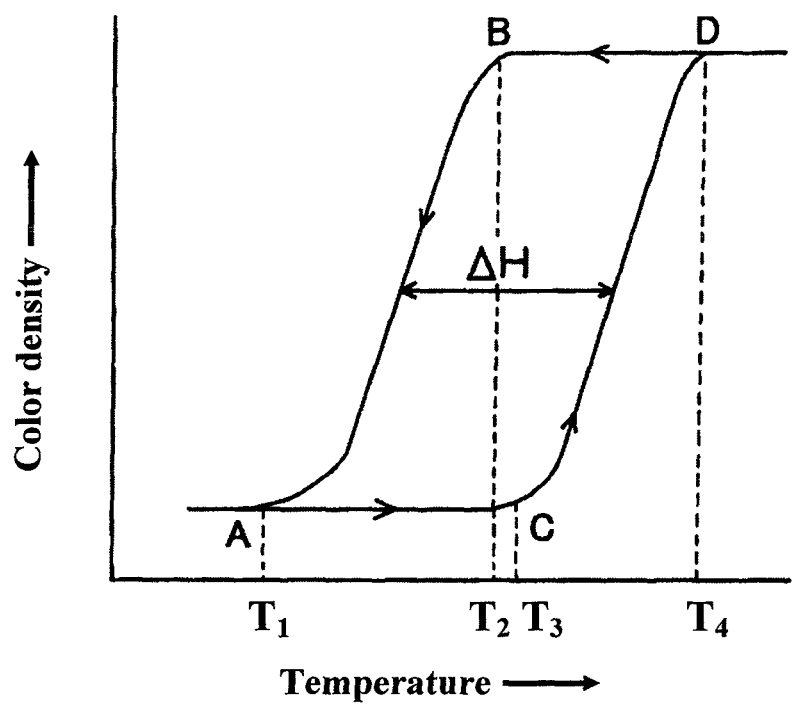
FIG. 3 is an illustrative drawing showing a discoloration behavior of a heat-coloring type reversibly thermochromic microcapsule pigments.

Furthermore, there can be also applied a heat-coloring type microcapsule pigment containing a reversibly thermochromic composition using a specific alkoxyphenol compound having a linear or branched alkyl group having 3 to 18 carbon atoms (JP-A-11-129623), a specific hydroxybenzoic acid ester (JP-A-2001-105732), a gallic acid ester (JP-A-2003-253149), or the like as the electron accepting compound (see FIG. 3).

The component (C) which is a reaction medium which reversibly induces an electron donating and accepting reaction between the above components (A) and (B) in a specified temperature region will be explained. Examples of the component (C) include esters, ketones, ethers, alcohols, and acid amides.

As the component (C), there may be mentioned a carboxylic acid ester compound, by mixed with the above components (A) and (B), which discolors with showing a large hysteresis characteristic with regard to a color density-temperature curve (characteristic that a curve plotting a change in color density with a temperature change is different between the case where the temperature is changed from a lower temperature side to a higher temperature side and the case where the temperature is changed from a higher temperature side to a lower temperature side), is capable of forming a reversibly thermochromic composition having a color-memory property, and shows a $\Delta T$ value (melting point-cloud point) ranging from 5° C. to less than 50° C. Specifically, for example, there can be used a carboxylic acid ester containing a substituted aromatic ring in the molecule, an ester of a carboxylic acid containing an unsubstituted aromatic ring with an aliphatic alcohol having 10 or more carbon atoms, a carboxylic acid ester containing a cyclohexyl group in the molecule, an ester of a fatty acid having 6 or more carbon atoms with an unsubstituted aromatic alcohol or phenol, an ester of a fatty acid having 8 or more carbon atoms with a branched aliphatic alcohol, an ester of a dicarboxylic acid with an aromatic alcohol or a branched aliphatic alcohol, dibenzyl cinnamate, heptyl stearate, didecyl adipate, dilauryl adipate, dimyristyl adipate, dicetyl adipate, distearyl adipate, trilaurin, trimyristin, tristearin, dimyristin, or distearin.

In addition, a fatty acid ester compound obtained from an aliphatic monohydric alcohol having 9 or more odd-numbered carbon atoms and an aliphatic carboxylic acid having even-numbered carbon atoms, and a fatty acid ester compound having from 17 to 23 carbon atoms in total obtained from n-pentyl alcohol or n-heptyl alcohol and an aliphatic carboxylic acid having from 10 to 16 even-numbered carbon atoms are also effective.

Specifically, there may be mentioned n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, and n-pentadecyl behenate.

As the ketones, aliphatic ketones having 10 or more carbon atoms in total are effective and there may be mentioned 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone.

Also, there may be mentioned aryl alkyl ketones having from 12 to 24 carbon atoms in total, for examples, n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone.

As the ethers, aliphatic ethers having 10 or more carbon atoms in total are effective and there may be mentioned dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether.

As the alcohols, aliphatic monohydric saturated alcohols having 10 or more carbon atoms are effective and there may be mentioned decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, and docosyl alcohol.

As the acid amides, there may be mentioned hexanamide, heptanamide, octanamide, nonanamide, decanamide, undecanamide, lauryamide, tridecanamide, myristamide, palmitamide, stearamide, and docosanamide.

In addition, as the above component (C), a compound represented by the following formula (1) described in JP-A-2006-137886 is suitably used:

[Chem. 1]

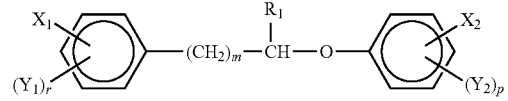

(1)

wherein $R_1$ represents a hydrogen atom or a methyl group, m represents an integer of 0 to 2, either one of $X_1$ and $X_2$ represents $—(CH_2)_nOCOR_2$ or $—(CH_2)_nCOOR_2$ and the other represents a hydrogen atom, n represents an integer of 0 to 2, $R_2$ represents an alkyl or alkenyl group having from 4 or more carbon atoms, $Y_1$ and $Y_2$ each represents a hydrogen atom, an alkyl group having from 1 to 4 carbon atoms, a methoxy group, or a halogen, and r and p each represents an integer of 1 to 3.

Among the compounds represented by the above formula (1), the case where $R_1$ is a hydrogen atom is preferred since the reversibly thermochromic composition having a wider hysteresis width can be obtained. Furthermore, the case where $R_1$ is a hydrogen atom and m is 0 is more preferred.

In this connection, among the compounds represented by the formula (1), a compound represented by the following formula (2) is more preferably used:

[Chem. 2]

(2)

wherein R represents an alkyl or alkenyl group having 8 or more carbon atoms, and preferred is an alkyl group having from 10 to 24 carbon atoms and more preferred is an alkyl group having from 12 to 22 carbon atoms.

Specific examples of the above compounds may include 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, and 4-benzyloxyphenylethyl octadecanoate.

Furthermore, as the above component (C), a compound represented by the following formula (3) described in JP-A-2006-188660 can be also used:

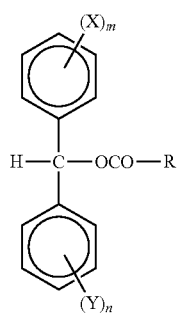

(3)

wherein R represents an alkyl or alkenyl group having 8 or more carbon atoms, m and n each represents an integer of 1 to 3, X and Y each represents a hydrogen atom, an alkyl group having from 1 to 4 carbon atom, an alkoxy group having from 1 to 4 carbon atom, or a halogen atom.

Specific examples of the above compound include 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, and 1,1-diphenylmethyl octadecanoate.

In addition, as the above component (C), a compound represented by the following formula (4) described in JP-A-2008-280523 can be also used:

[Chem. 4]

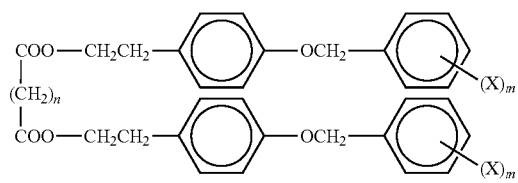

(4)

wherein X represents any of a hydrogen atom, an alkyl group having 1 to 4 carbon atoms, a methoxy group, and a halogen atom, m represents an integer of 1 to 3, and n represents an integer of 1 to 20.

Examples of the above compound may include diester of malonic acid with 2-[4-(4-chlorobenzyloxy)phenyl]ethanol, diester of succinic acid with 2-(4-benzyloxyphenyl)ethanol, diester of succinic acid with 2-[4-(3-methylbenzyloxy)phenyl]ethanol, diester of glutaric acid with 2-(4-benzyloxyphenyl)ethanol, diester of glutaric acid with 2-[4-(4-chlorobenzyloxy)phenyl]ethanol, diester of adipic acid with 2-(4-benzyloxyphenyl)ethanol, diester of pimelic acid with 2-(4-benzyloxyphenyl)ethanol, diester of suberic acid with 2-(4-benzyloxyphenyl)ethanol, diester of suberic acid with 2-[4-(3-methylbenzyloxy)phenyl]ethanol, diester of suberic acid with 2-[4-(4-chlorobenzyloxy)phenyl]ethanol, diester of suberic acid with 2-[4-(2,4-dichlorobenzyloxy)phenyl]ethanol, diester of azelaic acid with 2-(4-benzyloxyphenyl)ethanol, diester of sebacic acid with 2-(4-benzyloxyphenyl)ethanol, diester of 1,10-decanedicarboxylic acid with 2-(4-benzyloxyphenyl)ethanol, diester of 1,18-octadecanedicarboxylic acid with 2-(4-benzyloxyphenyl)ethanol, and diester of 1,18-octadecanedicarboxylic acid with 2-[4-(2-methylbenzyloxy)phenyl]ethanol.

Furthermore, as the above component (C), a compound represented by the following general formula (5) can be also used:

[Chem 5]

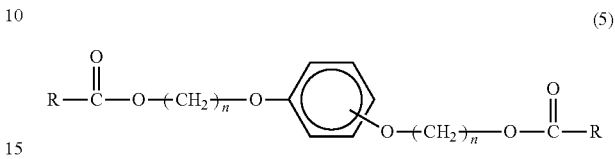

(5)

wherein R represents an alkyl group or alkenyl group having 1 to 21 carbon atoms and n represents an integer of 1 to 3.

Examples of the above compound may include diester of 1,3-bis(2-hydroxyethoxy)benzene with capric acid, diester of 1,3-bis(2-hydroxyethoxy)benzene with undecanoic acid, diester of 1,3-bis(2-hydroxyethoxy)benzene with lauric acid, diester of 1,3-bis(2-hydroxyethoxy)benzene with myristic acid, diester of 1,4-bis(hydroxymethoxy)benzene with butyric acid, diester of 1,4-bis(hydroxymethoxy)benzene with isovaleric acid, diester of 1,4-bis(2-hydroxyethoxy)benzene with acetic acid, diester of 1,4-bis(2-hydroxyethoxy)benzene with propionic acid, diester of 1,4-bis(2-hydroxyethoxy)benzene with valeric acid, diester of 1,4-bis(2-hydroxyethoxy)benzene with caproic acid, diester of 1,4-bis(2-hydroxyethoxy)benzene with caprylic acid, diester of 1,4-bis(2-hydroxyethoxy)benzene with capric acid, diester of 1,4-bis(2-hydroxyethoxy)benzene with lauric acid, and diester of 1,4-bis(2-hydroxyethoxy)benzene with myristic acid.

Though the ratio of the above components (A), (B) and (C) to be mixed depends on the concentration, discoloration temperature, discoloration mode and kind of each component, the component ratio at which desired discoloration characteristics can be generally obtained is in the range of 0.1 to 50, preferably 0.5 to 20 of the component (B), and in the range of 1 to 800, preferably from 5 to 200 of the component (C), based on 1 of the component (A) (each of the aforementioned ratios is expressed as part(s) by mass).

In this regard, it is also possible to cause interchangeable color change from a color (1) to a color (2) by incorporating a coloring agent such as a non-thermochromic dyestuff or pigment into the above reversibly thermochromic microcapsule pigment or ink.

Examples of the microencapsulation method of the reversibly thermochromic composition include interfacial polymerization, interfacial polycondensation, in situ polymerization, submerged coat hardening, phase separation from an aqueous solution, phase separation from an organic solvent, melt dispersion cooling, aerial suspension coating, or spray drying. It can be selected as needed, depending on the use purpose.

As the materials for the above capsules, there may be mentioned epoxy resins, urea resins, urethane resins, isocyanate resins, and the like.

It is also possible to provide the microcapsule for practical use after imparting durability thereto by forming a secondary resin film on the surface thereof or after modifying the surface properties, depending on the purpose.

As the form of the microcapsule pigment of the present invention, the application of a form having a round cross-section is not refused but a form having a non-round cross-section is effective.

With regard to the handwriting formed by writing, the microcapsule pigment is densely aligned and firmly fixed while bringing the long diameter side (maximum outer diameter side) into close contact with the written surface. Thereby, the handwriting shows a high-density coloring characteristic. At the same time, against an external force generated by rubbing the handwriting with a frictional body such as rubber, the above microcapsule pigment subtly undergoes elastic deformation into a shape so as to relax the external force, the destruction of the wall membrane of the microcapsule is suppressed, and the thermochromic function thereof can be effectively expressed without impaired.

It is preferred that the above microcapsule pigment has an average particle diameter (average value of maximum outer diameter) falling within a range of 0.5 to 5.0 µm, preferably 1.0 to 4.0 µm, and more preferably 1.0 to 3.0 µm, and satisfies the requirement that the reversibly thermochromic composition/wall membrane ratio=7:1 to 1:1 (mass ratio), and preferably 6:1 to 1:1.

When the average particle diameter of the microcapsule pigment (including that having a round cross-section) exceeds 5.0 µm, decrease in effluence from capillary gaps tends to occur, while when the average particle diameter is less than 0.5 µm, a high-density coloring characteristic is not easily exhibited.

When the ratio of the reversibly thermochromic composition to the wall membrane is larger than the above range, the wall membrane becomes exceedingly thin and hence decrease in durability against pressure and heat is apt to occur, while when the ratio of the wall membrane to the reversibly thermochromic composition is larger than the above range, decrease in color density and vividness tends to occur.

Incidentally, the particle diameter is measured by using a laser diffraction/scattering particle diameter distribution measuring device [LA-300 manufactured by Horiba, Co., Ltd.], and an average particle diameter (median diameter) is calculated on the basis of the measured value.

The above reversibly thermochromic microcapsule pigment may be incorporated in an amount of 5 to 40% by mass, preferably 10 to 40% by mass, and further preferably 15 to 35% by mass based on the total amount of the ink composition.

When the amount is less than 5% by mass, the color density is insufficient, while when it exceeds 40% by mass, ink effluence decreases and hence writing performance may be inhibited.

As the medium to be used in the ink composition of the present invention, water and a water-soluble organic solvent are used.

As the above water-soluble organic solvent, for example, ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, N-methyl-2-pyrrolidone, or the like may be used.

In this connection, since the specific gravity of the microcapsule pigment containing a reversibly thermochromic composition having a large hysteresis width generally exceeds 1, the water-soluble organic solvent having a specific gravity of more than 1.1 is preferably employed.

As the water-soluble organic solvent, glycerin is preferably used and which can be incorporated in an amount of 5 to 40% by mass, preferably 25 to 40% by mass, and further preferably 30 to 35% by mass based on the total amount of the ink composition.

The comb type polymer dispersant having carboxyl groups on its side chains contained in the ink composition of the present invention is not particularly limited so far as it is a comb type polymer compound having a plurality of carboxyl groups on its side chains and acrylic polymer compounds having a plurality of carboxyl groups on its side chains are preferred. As the compound, trade name: Solsparse 43000 manufactured by Lubrizol Japan Ltd. can be mentioned as an example.

By combined use of the comb-type polymer dispersant having carboxyl groups on its side chains and an organic nitrogen sulfur compound together, the long-term dispersion stability of the microcapsule pigment itself can be improved.

The organic nitrogen sulfur compound further suppresses the sedimentation of the microcapsule pigment induced by vibration at the time when the ink composition is filled into a writing instrument for practical use.

This is because the compound further improves the dispersibility of dispersing the microcapsule pigment by the comb type polymer dispersant having carboxyl groups on its side chain.

As the organic nitrogen sulfur compound, a compound selected from thiazole compounds, isothiazole compounds, benzothiazole compounds, and benzisothiazole compounds may be used.

As the organic nitrogen sulfur compound, specifically, one or more compounds selected from 2-(4-thiazoyl)-benzimidazole (TBZ), 2-(thiocyanatomethylthio)-1,3-benzothiazole (TCMTB), 2-methyl-4-isothiazolin-3-one, and 5-chloro-2-methyl-4-isothiazolin-3-one are preferably used, and one or more compounds selected from 2-(4-thiazoyl)-benzimidazole (TBZ), 2-methyl-4-isothiazolin-3-one, and 5-chloro-2-methyl-4-isothiazolin-3-one are more preferably used.

The organic nitrogen sulfur compound may be exemplified by trade names: Topside 88, Topside 133, Topside 170, Topside 220, Topside 228, Topside 300, Topside 400, Topside 500, Topside 600, Topside 700Z, Topside 800, and Topside 950 manufactured by Parmachem Asia Ltd.; and trade names: Hokustar HP, Hokustar E50A, Hokuside P200, Hokuside 6500, Hokuside 7400, Hokuside MC, Hokuside 369, and Hokuside R-150 manufactured by Hokko Sangyo Co., Ltd.

The mass ratio of the above comb type polymer dispersant having carboxyl groups on its side chains to the organic nitrogen sulfur compound is 1:1 to 1:10, and preferably from 1:1 to 1:5. By satisfying the above range, it is possible to sufficiently develop dispersibility of the microcapsule pigment and suppression of the sedimentation of the microcapsule pigment induced by vibration.

The above water-soluble resin contained in the ink composition of the present invention is added in order to impart a fixing property of the ink to the paper surface or viscosity and also has a function to increase the stability of the above comb type polymer dispersant having carboxyl groups in its side chains and the organic nitrogen sulfur compound in the ink.

As the water-soluble resin, there may be mentioned alkyd resins, acrylic resins, styrene-maleic acid copolymers, cellulose derivatives, polyvinylpyrrolidone, polyvinyl alcohol, and dextrin, and further preferably, a partially saponification type polyvinyl alcohol which is rich in solubility in an acidic range and has a saponification degree of 70 to 89% by mol is suitably used.

As the additive amount of the water-soluble resin, it is added into the ink in a range of 0.3 to 3.0% by mass, preferably 0.5 to 1.5% by mass.

By controlling the pH of the ink composition of the present invention to 3 to 7, preferably 4 to 6, and more preferably 5 to 6, the flocculation and sedimentation of the contained reversibly thermochromic microcapsule pigment in a low temperature region can be suppressed.

When the pH exceeds 7, the ink effluence tends to be impaired at the time of allowed to stand in a low temperature region, i.e., a temperature region where the ink is frozen. Also, when the pH is less than 3, the coloring characteristic of the reversibly thermochromic composition contained in the capsule is strengthened and hence there may arise a problem that a color remains at decoloring.

Incidentally, as the above water-soluble resin, it is preferred to use a water-soluble resin soluble in the ink composition in the range where the pH of the ink composition is 3 to 7.

The above ink composition is controlled in its surface tension at 20° C. to a range of preferably 25 to 45 mN/m, more preferably 30 to 45 mN/m, and further preferably 30 to 40 mN/m.

By controlling the surface tension to the above range, disconnection at writing hardly occurs, the ink effluence is not impaired even when allowed to stand in a temperature region lower than 0° C. where the ink is frozen or allowed to stand at a high temperature region, e.g., under an environment of 50° C., and unevenness in handwriting density and writing width depending on the storage environment and use environment hardly occurs.

When the surface tension is less than 25 mN/m, the ink effluence tends to be unstable and the handwriting density becomes uneven in some cases. Also, when the surface tension exceeds 45 mN/m, line splitting tends to occur and also the ink effluence decreases depending on the storage environment and use environment described above, thereby handwriting density may decrease and unevenness in writing width is apt to occur.

In addition, if necessary, there may be used antirusts such as benzotriazole, tolyltriazole, dicyclohexylammonium nitrite, diisopropylammonium nitrite, and saponin; wetting agents such as urea, nonionic surfactants, reduced or unreduced starch hydrolyzates, disaccharides including trehalose, oligosaccharides, sucrose, cyclodextrins, glucose, dextrins, sorbitol, mannitol, and sodium pyrophosphate; defoaming agents; fluorine-based surfactants or nonionic surfactants which improve permeability of the ink.

Furthermore, a sodium salt of a naphthalenesulfonic acid-formalin condensate [trade name: DEMOL N manufactured by Kao Corporation] can be also used as a surfactant and is preferably used in combination with glycerin.

Moreover, as the structure of the writing instrument receiving the above ink composition, there may be mentioned a direct liquid type writing instrument having a structure where a valve mechanism is provided in the axle body and the ink in the axle body is delivered to the pen body by opening the valve or a direct liquid type writing instrument having a structure where the ink is directly received inside the axle body and an ink flow-controlling member having comb-shape grooves or an ink flow-controlling member comprising a fiber bundle intervenes. However, suitable is an inner-wadding type writing instrument having a structure where an ink occlusion body comprising a fiber bundle to be received in the axle body is impregnated with the ink, a pen body is mounted on the writing front end, and the rear end of the pen body comes into contact with the ink occlusion body directly or via a connection member.

The above ink occlusion body is formed by bundling crimped fibers in a longitudinal direction and is configured by incorporating the fibers into a covering material such as a plastic tube or a film and adjusting the porosity within a range of about 40 to 90%. In this connection, the above fiber bundle body may be one adhesion-processed by resin processing, thermal fusion processing, a plasticizer, or the like.

For the above axle body, a molded body formed from a thermoplastic resin such as polyethylene, polypropylene, polyethylene terephthalate, or Nylon is suitably employed.

As the pen body, a marking pen body is suitable and pen bodies made of fibers, felts, plastics, and the like may be mentioned.

The front-end shape of the marking pen body may be either a cannonball form or a chisel form.

Moreover, a brush pen body or a ball-point pen body may be used. Examples of the brush pen body include a fiber bundle body in which fibers are closely bundled each other in a longitudinal direction, a plastic porous body having continuous voids, a thermally fused or resin processed body of a synthetic resin fiber, and an extrusion processed body of a soft resin or an elastomer.

Examples of the ball-point pen include one in which a metal is cut to form a ball-receiving seat and an ink-delivering part inside, and one in which a plurality of inward protruded parts are provided at the inner surface near to one end of a metal pipe by external press deformation and ink-effluent gaps radially extending outward from the central part in a radial direction are formed between the individual above inward protruded parts.

The ball held in the above ball-point pen is effectively a ball of a cemented carbide, a stainless steel, ruby, a ceramic, or the like, having an outer diameter of 0.3 to 2.0 mm, preferably 0.4 to 1.5 mm, and more preferably 0.5 to 1.0 mm.

In this connection, the above ball-point pen may have a constitution wherein a snapping member which snaps the rear part of the ball forward is provided so that the ball is pressed to the inner rim of front end of the pen body to be in a closely contacted state at non-writing and the ball is retracted by writing pressure to enable the effluence of the ink at writing.

The handwriting formed with a writing instrument receiving the above ink composition can be discolored by rubbing with a finger or application of a heating device or a cooling device.

Examples of the heating device include a conducting thermochromic device equipped with a resistor heating body, a heating discoloration device filled with hot water or the like, and application of a hair drier. Preferably, a frictional member or a frictional body capable of discoloration by a conventional method is used.

As the frictional member or frictional body, an elastic body such as an elastomer or a plastic foamed body, which has a good elasticity and can generate frictional heat by an appropriate friction at rubbing, is suitable and may be a plastic molded body, a stone, a wood, a metal, or a fabric.

In this connection, the handwriting can be rubbed by means of a gum eraser but, since shavings of the eraser are generated at rubbing, the frictional member as mentioned above is preferably used.

As a material for the above frictional member or frictional body, a silicone resin or an SEBS resin (styrene-ethylene-butadiene-styrene block copolymer) is suitably used but the SEBS resin is more suitably used since the silicone resin tends to adhere to the portion erased with rubbing and the handwriting tends to be repelled at repeated writing.

The above frictional member may be a member (frictional body) having any shape separated from the writing instrument, but portability is excellent when fixing the frictional body to the writing instrument.

The portion to which the above frictional member is fixed may be the front end (top part) of a cap or the rear end (portion on which a writing front end is not installed) of an axle body.

Furthermore, it is also possible to provide a small protruded portion having any shape at a part of the cap or a part of the axle body to form a frictional member.

Examples of the cooling device include a cold heat discoloration device using a Peltier element, a cold heat discoloration device in which a refrigerant such as cold water or ice pieces is filled, and application of a refrigerator or a freezer.

In addition, a writing instrument set can also be obtained by combining the above writing instrument and a frictional body.

EXAMPLES

The following will illustrate Examples of the reversibly thermochromic aqueous ink compositions for writing instruments of the present invention and writing instruments using the same but the present invention should not be construed as being limited thereto.

In this connection, the term "part(s)" in Examples means part(s) by weight.

The surface tension of the ink was measured in a state that temperature of the ink composition was 20° C. by means of an automatic surface tensiometer (CBVP-A3) manufactured by Kyowa Interface Science Co., Ltd.

Example 1

Preparation of Reversibly Thermochromic Microcapsule Pigment

A microcapsule pigment suspension which contained a reversibly thermochromic composition having a color-memory property and composed of 3.0 parts of 1,3-dimethyl-6-diethylaminofluorane as the component (A), 3.0 parts of 4,4'-(2-ethylhexane-1,1-diyl)diphenol and 5.0 parts of 2,2-bis(4'-hydroxyphenyl)-hexafluoropropane as the component (B), and 50.0 parts of 4-benzyloxyphenylethyl caprate as the component (C), was obtained.

The above suspension was centrifuged to isolate a reversibly thermochromic microcapsule pigment.

The average particle diameter of the microcapsule pigment is 2.5 μm, the complete decoloring temperature is 60° C., and the complete coloring temperature is −20° C. The pigment changes color from orange to colorless through a change in temperature.

Preparation of Reversibly Thermochromic Aqueous Ink Composition

A reversibly thermochromic aqueous ink composition was obtained by blending 25.0 parts of the above microcapsule pigment (colored orange by cooling to −20° C. or lower beforehand), 0.5 part of a comb type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd., a mixture of 2-methyl-4-isothiazolin-3-one and 5-chloro-2-methyl-4-isothiazolin-3-one], 0.5 part of polyvinyl alcohol, 35.0 parts of glycerin, 0.02 part of a defoaming agent (silicone-based), and 37.98 parts of water.

The pH of the above ink composition was 7.00 and the surface tension was 39.8 mN/m.

Figure 4:
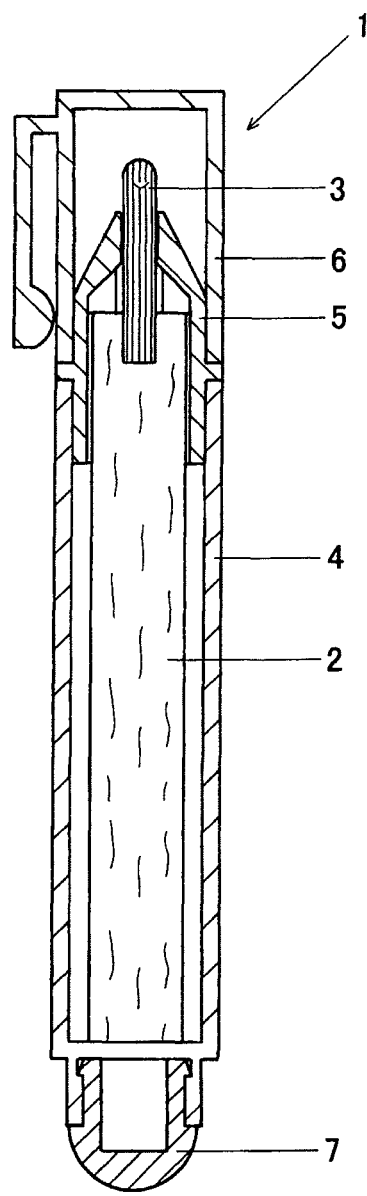
FIG. 4 is an illustrative drawing showing one example of the writing instrument according to the present invention.

Preparation of Inner-Wadding Type Writing Instrument (See FIG. 4)

An ink occlusion body 2, in which a polyester sliver was coated with a synthetic resin film, was impregnated with the above ink composition, received in an axle body 4 made of a polypropylene resin, and assembled with a resin processed pen body 3 (cannonball type) of polyester fiber on the front end of the axle body via a holder 5 in the connected state, and a cap 6 was then fitted thereto, whereby an inner-wadding type writing instrument 1 (marking pen) was obtained.

An SEBS resin was fitted to the rear end of the axle body as a frictional member 7.

Using the above writing instrument, an orange letter (handwriting) was formed by writing on a sheet of paper.

The above handwriting showed orange at room temperature (25° C.), but the letter decolored and became colorless when rubbed using the frictional member fitted to the axle body. This state was maintained under room temperature. When the sheet of paper was cooled to −20° C. or lower, the color was returned to original orange and the discoloration behavior was reproduced repeatedly.

Example 2

Preparation of Reversibly Thermochromic Microcapsule Pigment

A microcapsule pigment suspension which contained a reversibly thermochromic composition having a color-memory property and composed of 1.0 part of 2-(dibutylamino)-8-(dipentylamino)-4-methyl-spiro[5H-[1]benzopyrano[2,3-g]pyrimidine-5,1'-(3'H)-isobenzofuran]-3-one as the component (A), 3.0 parts of 4,4'-(2-ethylhexane-1,1-diyl) diphenol and 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversibly thermochromic microcapsule pigment.

The average particle diameter of the above microcapsule pigment is 2.3 μm, the complete decoloring temperature is 58° C., and the complete coloring temperature is −20° C. The pigment changes color from pink to colorless through a change in temperature.

Preparation of Reversibly Thermochromic Aqueous Ink Composition

A reversibly thermochromic aqueous ink composition was obtained by blending 25.0 parts of the above reversibly thermochromic microcapsule pigment (colored pink by cooling to −20° C. or lower beforehand), 0.5 part of a comb type polymer dispersant [trade name: Solsparse 43000 manufactured by Lubrizol Japan Ltd.], 1.0 part of an organic nitrogen sulfur compound [trade name: Hokuside 369 manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.98 and the surface tension was 40.0 mN/m.

Preparation of Inner-Wadding Type Writing Instrument

An ink occlusion body, in which a polyester sliver was coated with a synthetic resin film, was impregnated with the above ink composition, received in an axle body made of a polypropylene resin, and assembled with a resin processed pen body (cannonball type) of polyester fiber on the front end of the axle body via a holder in the connected state, and a cap was then fitted thereto, whereby an inner-wadding type writing instrument (marking pen) was obtained.

An SEBS resin was fitted to the rear end of the above axle body as a frictional member.

Using the above marking pen, a pink letter (handwriting) was formed by writing on a letter printed on a sheet of paper.

The above handwriting showed pink at room temperature (25° C.), but the handwriting decolored and became colorless when rubbed using the frictional body fitted to the axle body. This state was maintained under room temperature. When the sheet of paper was cooled to −20° C. or lower, the color was returned to original pink and the discoloration behavior was reproduced repeatedly.

Example 3

Preparation of Reversibly Thermochromic Microcapsule Pigment

A microcapsule pigment suspension which contained a reversibly thermochromic composition having a color-memory property and composed of 4.5 parts of 2-(2-chloroamino)-6-dibutylaminofluorane as the component (A), 3.0 parts of 4,4'-(2-ethylhexane-1,1-diyl)diphenol and 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversibly thermochromic microcapsule pigment.

The average particle diameter of the above microcapsule pigment is 2.4 μm, the complete decoloring temperature is 56° C., and the complete coloring temperature is −20° C. The pigment changes color from black to colorless through a change in temperature.

Preparation of Reversibly Thermochromic Aqueous Ink Composition

A reversibly thermochromic aqueous ink composition was obtained by blending 30.0 parts of the above reversibly thermochromic microcapsule pigment (colored black by cooling to −20° C. or lower beforehand), 0.5 part of a comb type polymer dispersant [trade name: Solsparse 43000 manufactured by Lubrizol Japan Ltd.], 1.0 part of an organic 3 5 nitrogen sulfur compound [trade name: Hokustar HP manufactured by Hokko Chemical Industry Co., Ltd., 2-(4-thiazoyl)-benzimidazol], 0.5 part of polyvinyl alcohol, 35.0 parts of glycerin, 0.02 part of a defoaming agent (silicone-based), and 32.98 parts of water.

The pH of the above ink composition was 7.1 and the surface tension was 38.5 mN/m.

Preparation of Inner-Wadding Type Writing Instrument

An ink occlusion body, in which a polyester sliver was coated with a synthetic resin film, was impregnated with the above ink composition, received in an axle body made of a polypropylene resin, and assembled with a resin processed pen body (cannonball type) of polyester fiber on the front end of the axle body via a holder in the connected state, and a cap was then fitted thereto, whereby an inner-wadding type writing instrument (marking pen) was obtained.

An SEBS resin was fitted to the cap at the top part thereof as a frictional member.

Using the above marking pen, a black letter (handwriting) was formed by writing on a sheet of paper.

The above handwriting showed black at room temperature (25° C.), but the handwriting decolored and became colorless when rubbed using the frictional body fitted to the cap. This state was maintained under room temperature. When the sheet of paper was cooled to −20° C. or lower, the color was returned to original black and the discoloration behavior was reproduced repeatedly.

Example 4

Preparation of Reversibly Thermochromic Microcapsule Pigment

A microcapsule pigment suspension which contained a reversibly thermochromic composition having a color-memory property and composed of 3.0 parts of 4-[2,6-bis(2-ethoxyphenyl)-4-pyridinyl]-N,N-dimethylbenzeneamine as the component (A), 10.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversibly thermochromic microcapsule pigment.

The average particle diameter of the above microcapsule pigment is 2.5 μm, the complete decoloring temperature is 59° C., and the complete coloring temperature is −20° C. The pigment changes color from yellow to colorless through a change in temperature.

Preparation of Reversibly Thermochromic Aqueous Ink Composition

A reversibly thermochromic aqueous ink composition was obtained by blending 25.0 parts of the above reversibly thermochromic microcapsule pigment (colored yellow by cooling to −20° C. or lower beforehand), 0.5 part of a comb type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd., a mixture of 2-methyl-4-isothiazolin-3-one and 5-chloro-2-methyl-4-isothiazolin-3-one], 0.5 part of polyvinyl alcohol, 35.0 parts of glycerin, 0.02 part of a defoaming agent (silicone-based), and 37.98 parts of water.

The pH of the above ink composition was 7.05 and the surface tension was 39.8 mN/m.

Preparation of Inner-Wadding Type Writing Instrument

An ink occlusion body, in which a polyester sliver was coated with a synthetic resin film, was impregnated with the above ink composition, received in an axle body made of a polypropylene resin, and assembled with a resin processed pen body (cannonball type) of polyester fiber on the front end of the axle body via a holder in the connected state, and a cap was then fitted thereto, whereby an inner-wadding type writing instrument (marking pen) was obtained.

An SEBS resin was fitted to the rear end of the above axle body as a frictional member.

Using the above marking pen, a yellow letter (handwriting) was formed by writing on a letter printed on a sheet of paper.

The above handwriting showed yellow at room temperature (25° C.), but the handwriting decolored and became colorless when rubbed using the frictional body fitted to the axle body. This state was maintained under room temperature. When the sheet of paper was cooled to −20° C. or lower, the color was returned to original yellow and the discoloration behavior was reproduced repeatedly.

Example 5

Preparation of Reversibly Thermochromic Microcapsule Pigment

A microcapsule pigment suspension which contained a reversibly thermochromic composition having a color-memory property and composed of 2.0 parts of 4,5,6,7-tetrachloro-3-[4-(dimethylamino)-2-methylphenyl]-3-(1-ethyl-2-methyl-1H-indol-3-yl)-1(3H)-isobenzofuranone as the component (A), 3.0 parts of 4,4'-(2-ethylhexane-1,1-diyl)diphenol and 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversibly thermochromic microcapsule pigment.

The average particle diameter of the above microcapsule pigment is 2.5 μm, the complete decoloring temperature is 55° C., and the complete coloring temperature is −20° C. The pigment changes color from blue to colorless through a change in temperature.

Preparation of Reversibly Thermochromic Aqueous Ink Composition

A reversibly thermochromic aqueous ink composition was obtained by blending 20.0 parts of the above reversibly thermochromic microcapsule pigment (colored blue by cooling to −20° C. or lower beforehand), 0.2 part of a comb type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd., a mixture of 2-methyl-4-isothiazolin-3-one and 5-chloro-2-methyl-4-isothiazolin-3-one], 0.5 part of polyvinyl alcohol, 30.0 parts of glycerin, 0.02 part of a defoaming agent (silicone-based), and 48.28 parts of water.

The pH of the above ink composition was 6.98 and the surface tension was 40.1 mN/m.

Preparation of Inner-Wadding Type Writing Instrument

An ink occlusion body, in which a polyester sliver was coated with a synthetic resin film, was impregnated with the above ink composition, received in an axle body made of a polypropylene resin, and assembled with a resin processed pen body (cannonball type) of polyester fiber on the front end of the axle body via a holder in the connected state, and a cap was then fitted thereto, whereby an inner-wadding type writing instrument (marking pen) was obtained.

An SEBS resin was fitted to the rear end of the above axle body as a frictional member.

Using the above writing instrument, a blue letter (handwriting) was formed by writing on a sheet of paper.

The above handwriting showed blue at room temperature (25° C.), but the handwriting decolored and became colorless when rubbed using the frictional body fitted to the axle body. This state was maintained under room temperature. When the sheet of paper was cooled to −20° C. or lower, the color was returned to original blue and the discoloration behavior was reproduced repeatedly.

Example 6

Preparation of Reversibly Thermochromic Microcapsule Pigment

A microcapsule pigment suspension which contained a reversibly thermochromic composition having a color-memory property and composed of 3.0 parts of 4-[2,6-bis(2-ethoxyphenyl)-4-pyridinyl]-N,N-dimethylbenzeneamine as the component (A), 10.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversibly thermochromic microcapsule pigment.

The average particle diameter of the above microcapsule pigment is 2.5 μm, the complete decoloring temperature is 59° C., and the complete coloring temperature is −20° C. The pigment changes color from yellow to colorless through a change in temperature.

Preparation of Reversibly Thermochromic Aqueous Ink Composition

A reversibly thermochromic aqueous ink composition was obtained by blending 25.0 parts of the above reversibly thermochromic microcapsule pigment (colored yellow by cooling to −20° C. or lower beforehand), 0.5 part of a comb type polymer dispersant [trade name: Solsparse 43000 manufactured by Lubrizol Japan Ltd.], 1.0 part of an organic nitrogen sulfur compound [trade name: Hokustar HP manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 7.00 and the surface tension was 38.5 mN/m.

Figure 5:
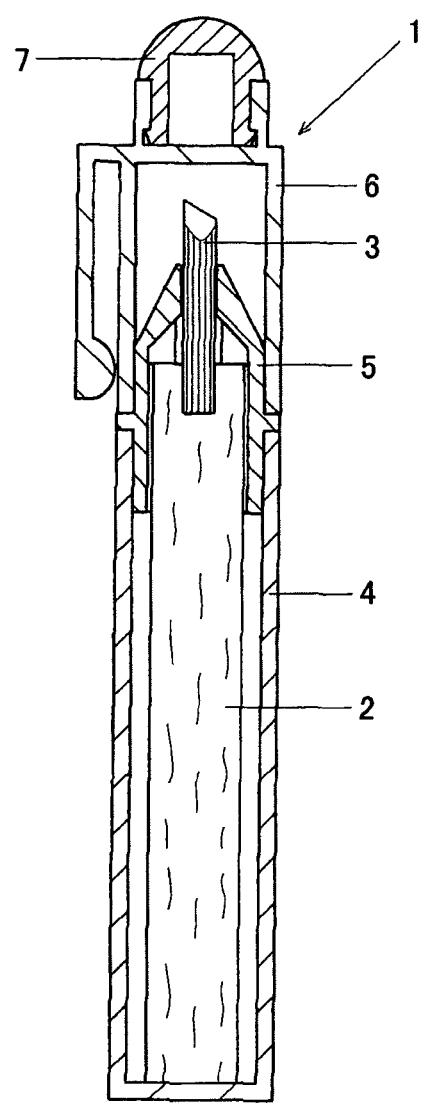
FIG. 5 is an illustrative drawing showing another example of the writing instrument according to the present invention.

Preparation of Inner-Wadding Type Writing Instrument (See FIG. 5)

An ink occlusion body 2, in which a polyester sliver was coated with a synthetic resin film, was impregnated with the above ink composition, received in an axle body 4 made of a polypropylene resin, and assembled with a resin processed pen body 3 (chisel type) of polyester fiber on the front end of the axle body via a holder 5 in the connected state, and a cap 6 was then fitted thereto, whereby an inner-wadding type writing instrument 1 (marking pen) was obtained.

An SEBS resin was fitted to the front end of the above cap as a frictional member.

Using the above marking pen, a yellow highlight (handwriting) was formed on a sheet of paper.

The above handwriting showed yellow at room temperature (25° C.), but the handwriting decolored and became colorless when rubbed using the frictional body fitted to the axle body. This state was maintained under room temperature. When the sheet of paper was cooled to −20° C. or lower, the color was returned to original yellow and the discoloration behavior was reproduced repeatedly.

Example 7

Preparation of Reversibly Thermochromic Microcapsule Pigment

A microcapsule pigment suspension which contained a reversibly thermochromic composition having a color-memory property and composed of 2.0 parts of 4,5,6,7-tetrachloro-3-[4-(dimethylamino)-2-methylphenyl]-3-(1-ethyl-2-methyl-1H-indol-3-yl)-1(3H)-isobenzofuranone as the component (A), 3.0 parts of 4,4'-(2-ethylhexane-1,1-diyl)diphenol and 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversibly thermochromic microcapsule pigment.

The average particle diameter of the above microcapsule pigment is 2.5 μm, the complete decoloring temperature is 55° C., and the complete coloring temperature is −20° C. The pigment changes color from blue to colorless through a change in temperature.

Preparation of Reversibly Thermochromic Aqueous Ink Composition

A reversibly thermochromic aqueous ink composition was obtained by blending 25.0 parts of the above reversibly thermochromic microcapsule pigment (colored blue by cooling to −20° C. or lower beforehand), 0.5 part of a comb type polymer dispersant [trade name: Solsparse 43000 manufactured by Lubrizol Japan Ltd.], 1.0 part of an organic 2 0 nitrogen sulfur compound [trade name: Hokustar HP manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.97 and the surface tension was 38.8 mN/m.

Preparation of Inner-Wadding Type Writing Instrument

An ink occlusion body, in which a polyester sliver was coated with a synthetic resin film, was impregnated with the above ink composition, received in an axle body made of a polypropylene resin, and assembled with a resin processed pen body (chisel 3 0 type) of polyester fiber on the front end of the axle body via a holder in the connected state, and a cap was then fitted thereto, whereby an inner-wadding type writing instrument (marking pen) was obtained.

An SEBS resin was fitted to the front end of the above cap as a frictional member.

Using the above writing instrument, a blue highlight (handwriting) was formed on a sheet of paper.

The above handwriting showed blue at room temperature (25° C.), but the handwriting decolored and became colorless when rubbed using the frictional body fitted to the axle body. This state was maintained under room temperature. When the sheet of paper was cooled to −20° C. or lower, the color was returned to original blue and the discoloration behavior was reproduced repeatedly.

Example 8

Preparation of Reversibly Thermochromic Microcapsule Pigment

A microcapsule pigment suspension which contained a reversibly thermochromic composition having a color-memory property and composed of 1.0 part of 2-(dibutylamino)-8-(dipentylamino)-4-methyl-spiro[5H-[1]benzopyrano[2,3-g]pyrimidine-5,1'(3'H)-isobenzofuran]-3-one as the component (A), 3.0 parts of 4,4'-(2-ethylhexane-1,1-diyl) diphenol and 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversibly thermochromic microcapsule pigment.

The average particle diameter of the above microcapsule pigment is 2.3 μm, the complete decoloring temperature is 58° C., and the complete coloring temperature is −20° C. The pigment changes color from pink to colorless through a change in temperature.

Preparation of Reversibly Thermochromic Aqueous Ink Composition

A reversibly thermochromic aqueous ink composition was obtained by blending 20.0 parts of the above reversibly thermochromic microcapsule pigment (colored pink by cooling to −20° C. or lower beforehand), 0.5 part of a comb type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd.], 0.5 part of polyvinyl alcohol, 33.0 parts of glycerin, 0.02 part of a defoaming agent (silicone-based), and 44.98 parts of water.

The pH of the above ink composition was 6.97 and the surface tension was 39.6 mN/m.

Figure 6:
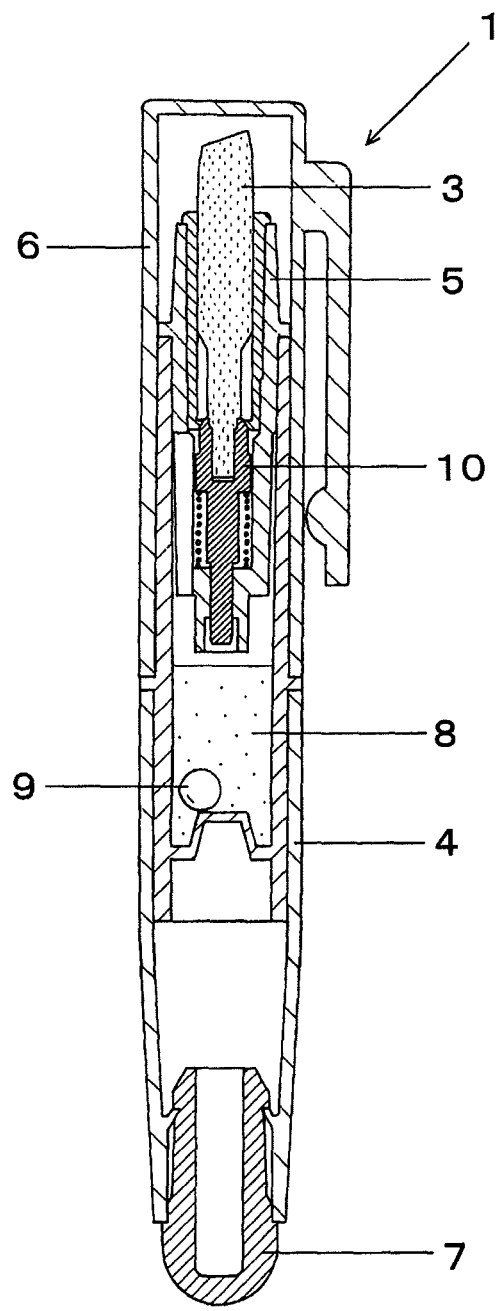
FIG. 6 is an illustrative drawing showing another example of the writing instrument according to the present invention.

Preparation of Direct Liquid Type Writing instrument (See FIG. 6)

The above ink 8 (which had been allowed to stand at room temperature after the microcapsule pigment had been colored pink by cooling to −20° C. or lower beforehand) and a stirring body 9 (SUS-304 ferrite-based stainless steel ball, diameter of 3 mm) were placed in an axle body 4 and a front marking pen body 3 [chisel type] was attached therewith via a holder 5 while a valve mechanism 10 intervened, whereby a direct liquid type writing instrument 1 (marking pen) was obtained.

In this connection, the above valve mechanism contains a valve seat, a valve body, and a metal spring which presses the above valve body so as to be pressure-welded to the valve seat, and has a structure where the valve is opened by a writing pressure applied to the pen body at writing.

An SEBS resin was fitted to the rear end of the above axle body as a frictional member 7.

Using the above writing instrument, a pink highlight (handwriting) was formed by writing on a sheet of paper.

The above handwriting showed pink at room temperature (25° C.), but the letter decolored and became colorless when rubbed using the frictional body. This state was maintained under room temperature. When the sheet of paper was cooled to −20° C. or lower, the color was returned to original pink and the discoloration behavior was reproduced repeatedly.

Example 9

Preparation of Reversibly Thermochromic Microcapsule Pigment

A reversibly thermochromic microcapsule pigment was obtained in the same manner as in Example 1 except that the average particle diameter of the microcapsule pigment was adjusted to 1.8 μm.

The complete decoloring temperature of the microcapsule pigment is 60° C., and the complete coloring temperature is −20° C. The pigment changes color from orange to colorless through a change in temperature.

Preparation of Reversibly Thermochromic Aqueous Ink Composition

A reversibly thermochromic aqueous ink composition was prepared in the same manner as in Example 1 except that the above microcapsule pigment (colored orange by cooling to −20° C. or lower beforehand) was used.

Preparation of Inner-Wadding Type Writing Instrument

An inner-wadding type writing instrument (marking pen) was prepared in the same manner as in Example 1 except that the above reversibly thermochromic aqueous ink composition was used.

Using the above writing instrument, an orange letter (handwriting) was formed by writing on a sheet of paper.

The above handwriting showed orange at room temperature (25° C.), but the handwriting decolored and became colorless when rubbed using the frictional member fitted to the axle body. This state was maintained under room temperature. When the sheet of paper was cooled to −20° C. or lower, the color was returned to original orange and the discoloration behavior was reproduced repeatedly.

Example 10

Preparation of Reversibly Thermochromic Microcapsule Pigment

A reversibly thermochromic microcapsule pigment was obtained in the same manner as in Example 1 except that the average particle diameter of the microcapsule pigment was adjusted to 1.5 μm.

The complete decoloring temperature of the microcapsule pigment is 60° C., and the complete coloring temperature is −25° C. The pigment changes color from orange to colorless through a change in temperature.

Preparation of Reversibly Thermochromic Aqueous Ink Composition

A reversibly thermochromic aqueous ink composition was prepared in the same manner as in Example 1 except that the above microcapsule pigment (colored orange by cooling to −25° C. or lower beforehand) was used.

Preparation of Inner-Wadding Type Writing Instrument

An inner-wadding type writing instrument (marking pen) was prepared in the same manner as in Example 1 except that the above reversibly thermochromic aqueous ink composition was used.

Using the above writing instrument, an orange letter (handwriting) was formed by writing on a sheet of paper.

The above handwriting showed orange at room temperature (25° C.), but the handwriting decolored and became colorless when rubbed using the frictional member fitted to the axle body. This state was maintained under room temperature. When the sheet of paper was cooled to −25° C. or lower, the color was returned to original orange and the discoloration behavior was reproduced repeatedly.

Example 11

Preparation of Reversibly Thermochromic Microcapsule Pigment

A reversibly thermochromic microcapsule pigment was obtained in the same manner as in Example 1 except that the average particle diameter of the microcapsule pigment was adjusted to 1.1 µm.

The complete decoloring temperature of the microcapsule pigment is 60° C., and the complete coloring temperature is −30° C. The pigment changes color from orange to colorless through a change in temperature.

Preparation of Reversibly Thermochromic Aqueous Ink Composition

A reversibly thermochromic aqueous ink composition was prepared in the same manner as in Example 1 except that the above microcapsule pigment (colored orange by cooling to −30° C. or lower beforehand) was used.

Preparation of Inner-Wadding Type Writing Instrument

An inner-wadding type writing instrument (marking pen) was prepared in the same manner as in Example 1 except that the above reversibly thermochromic aqueous ink composition was used.

Using the above writing instrument, an orange letter (handwriting) was formed by writing on a sheet of paper.

The above handwriting showed orange at room temperature (25° C.), but the handwriting decolored and became colorless when rubbed using the frictional member fitted to the axle body. This state was maintained under room temperature. When the sheet of paper was cooled to −30° C. or lower, the color was returned to original orange and the discoloration behavior was reproduced repeatedly.

Example 12

Preparation of Reversibly Thermochromic Microcapsule Pigment

A reversibly thermochromic microcapsule pigment was obtained in the same manner as in Example 2 except that the average particle diameter of the microcapsule pigment was adjusted to 1.4 µm.

The complete decoloring temperature of the microcapsule pigment is 58° C., and the complete coloring temperature is −25° C. The pigment changes color from pink to colorless through a change in temperature.

Preparation of Reversibly Thermochromic Aqueous Ink Composition

A reversibly thermochromic aqueous ink composition was prepared in the same manner as in Example 2 except that the above microcapsule pigment (colored pink by cooling to −25° C. or lower beforehand) was used.

Preparation of Inner-Wadding Type Writing Instrument

An inner-wadding type writing instrument (marking pen) was prepared in the same manner as in Example 2 except that the above reversibly thermochromic aqueous ink composition was used.

Using the above marking pen, a pink letter (handwriting) was formed by writing on a letter printed on a sheet of paper.

The above handwriting showed pink at room temperature (25° C.), but the handwriting decolored and became colorless when rubbed using the frictional member fitted to the axle body. This state was maintained under room temperature. When the sheet of paper was cooled to −25° C. or lower, the color was returned to original pink and the discoloration behavior was reproduced repeatedly.

Example 13

Preparation of Reversibly Thermochromic Microcapsule Pigment

A reversibly thermochromic microcapsule pigment was obtained in the same manner as in Example 3 except that the average particle diameter of the microcapsule pigment was adjusted to 1.3 µm.

The complete decoloring temperature of the microcapsule pigment is 56° C., and the complete coloring temperature is −25° C. The pigment changes color from black to colorless through a change in temperature.

Preparation of Reversibly Thermochromic Aqueous Ink Composition

A reversibly thermochromic aqueous ink composition was prepared in the same manner as in Example 3 except that the above microcapsule pigment (colored black by cooling to −25° C. or lower beforehand) was used.

Preparation of Inner-Wadding Type Writing Instrument

An inner-wadding type writing instrument (marking pen) was prepared in the same manner as in Example 3 except that the above reversibly thermochromic aqueous ink composition was used.

Using the above marking pen, a black letter (handwriting) was formed by writing on a sheet of paper.

The above handwriting showed black at room temperature (25° C.), but the handwriting decolored and became colorless when rubbed using the frictional member fitted to the cap. This state was maintained under room temperature. When the sheet of paper was cooled to −25° C. or lower, the color was returned to original black and the discoloration behavior was reproduced repeatedly.

Comparative Example 1

Preparation of Reversibly Thermochromic Aqueous Ink Composition

A reversibly thermochromic aqueous ink composition was obtained by blending 25.0 parts of the reversibly thermochromic microcapsule pigment prepared in Example 1 (colored orange by cooling to −20° C. or lower beforehand), 1.0 part of an organic nitrogen sulfur compound [trade name: Hokuside R-150 manufactured by Hokko Chemical Industry Co., Ltd.], 0.5 part of polyvinyl alcohol, 35.0 parts of glycerin, 0.02 part of a defoaming agent (silicone-based), and 38.48 parts of water.

The pH of the above ink composition was 6.60 and the surface tension was 40.5 mN/m.

Preparation of Inner-Wadding Type Writing Instrument

The resulting ink composition was contained in a writing instrument in the same manner as in Example 1 to obtain an inner-wadding type writing instrument (marking pen).

Comparative Example 2

Preparation of Reversibly Thermochromic Aqueous Ink Composition

A reversibly thermochromic aqueous ink composition was obtained by blending 25.0 parts of the reversibly thermochromic microcapsule pigment prepared in Example 2 (colored pink by cooling to −20° C. or lower beforehand), 0.5 part of hydroxyethyl cellulose, 1.0 part of an organic nitrogen sulfur compound [trade name: Hokuside 369 manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.60 and the surface tension was 40.4 mN/m.

Preparation of Inner-Wadding Type Writing Instrument

The resulting ink composition was contained in a writing instrument in the same manner as in Example 2 to obtain an inner-wadding type writing instrument (marking pen).

Comparative Example 3

Preparation of Reversibly Thermochromic Aqueous Ink Composition

A reversibly thermochromic aqueous ink composition was obtained by blending 30.0 parts of the reversibly thermochromic microcapsule pigment prepared in Example 3 (colored black by cooling to −20° C. or lower beforehand), 0.5 part of hydroxyethyl cellulose, 1.0 part of an organic nitrogen sulfur compound [trade name: Hokustar HP manufactured by Hokko Chemical Industry Co., Ltd., 2-(4-thiazoyl)-benzimidazole], 0.5 part of polyvinyl alcohol, 35.0 parts of glycerin, 0.02 part of a defoaming agent (silicone-based), and 32.98 parts of water.

The pH of the above ink composition was 6.90 and the surface tension was 39.8 mN/m.

Preparation of Inner-Wadding Type Writing Instrument

The resulting ink composition was contained in a writing instrument in the same manner as in Example 3 to obtain an inner-wadding type writing instrument (marking pen).

Comparative Example 4

Preparation of Reversibly Thermochromic Aqueous Ink Composition

A reversibly thermochromic aqueous ink composition was obtained by blending 25.0 parts of the reversibly thermochromic microcapsule pigment prepared in Example 4 (colored yellow by cooling to −20° C. or lower beforehand), 0.5 part of hydroxyethyl cellulose, 1.0 part of an organic nitrogen sulfur compound [trade name: Hokuside NS manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.90 and the surface tension was 40.2 mN/m.

Preparation of Inner-Wadding Type Writing Instrument

The resulting ink composition was contained in a writing instrument in the same manner as in Example 4 to obtain an inner-wadding type writing instrument (marking pen).

Comparative Example 5

Preparation of Reversibly Thermochromic Aqueous Ink Composition

A reversibly thermochromic aqueous ink composition was obtained by blending 20.0 parts of the reversibly thermochromic microcapsule pigment prepared in Example 5 (colored blue by cooling to −20° C. or lower beforehand), 0.5 part of hydroxyethyl cellulose, 1.0 part of an organic nitrogen sulfur compound [trade name: Hokuside R150 manufactured by Hokko Chemical Industry Co., Ltd.], 0.5 part of polyvinyl alcohol, 30.0 parts of glycerin, 0.02 part of a defoaming agent (silicone-based), and 47.98 parts of water.

The pH of the above ink composition was 6.85 and the surface tension was 40.5 mN/m.

Preparation of Inner-Wadding Type Writing Instrument

The resulting ink composition was contained in a writing instrument in the same manner as in Example 5 to obtain an inner-wadding type writing instrument (marking pen).

Comparative Example 6

Preparation of Reversibly Thermochromic Aqueous Ink Composition

A reversibly thermochromic aqueous ink composition was obtained by blending 25.0 parts of the reversibly thermochromic microcapsule pigment prepared in Example 6 (colored yellow by cooling to −20° C. or lower beforehand), 0.5 part of hydroxyethyl cellulose, 1.0 part of an organic nitrogen sulfur compound [trade name: Hokustar HP manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.80 and the surface tension was 40.1 mN/m.

Preparation of Inner-Wadding Type Writing Instrument

The resulting ink composition was contained in a writing instrument in the same manner as in Example 6 to obtain an inner-wadding type writing instrument (marking pen).

Comparative Example 7

Preparation of Reversibly Thermochromic Aqueous Ink Composition

A reversibly thermochromic aqueous ink composition was obtained by blending 25.0 parts of the reversibly thermochromic microcapsule pigment prepared in Example 7 (colored blue by cooling to −20° C. or lower beforehand), 0.5 part of hydroxyethyl cellulose, 1.0 part of an organic nitrogen sulfur compound [trade name: Hokustar HP manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.78 and the surface tension was 39.8 mN/m.

Preparation of Inner-Wadding Type Writing Instrument

The resulting ink composition was contained in a writing instrument in the same manner as in Example 7 to obtain an inner-wadding type writing instrument (marking pen).

Comparative Example 8

Preparation of Reversibly Thermochromic Aqueous Ink Composition

A reversibly thermochromic aqueous ink composition was obtained by blending 20.0 parts of the reversibly thermochromic microcapsule pigment prepared in Example 8 (colored pink by cooling to −20° C. or lower beforehand), 0.5 part of hydroxyethyl cellulose, 1.0 part of an organic nitrogen sulfur compound [trade name: Hokuside R-150 manufactured by Hokko Chemical Industry Co., Ltd.], 1.0 part of polyvinyl alcohol, 33.0 parts of glycerin, 0.02 part of a defoaming agent (silicone-based), and 44.48 parts of water.

The pH of the above ink composition was 6.80 and the surface tension was 40.2 mN/m.

Preparation of Direct Liquid Type Writing Instrument

The resulting ink composition was contained in a writing instrument in the same manner as in Example 8 to obtain a direct liquid type writing instrument (marking pen).

Comparative Example 9

Preparation of Reversibly Thermochromic Aqueous Ink Composition

A reversibly thermochromic aqueous ink composition was obtained by blending 25.0 parts of the reversibly thermochromic microcapsule pigment prepared in Example 9 (colored orange by cooling to −20° C. or lower beforehand), 0.5 part of hydroxyethyl cellulose, 1.0 part of an organic nitrogen sulfur compound [trade name: Hokuside R-150 manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.85 and the surface tension was 40.0 mN/m.

Preparation of Inner-Wadding Type Writing Instrument

The resulting ink composition was contained in a writing instrument in the same manner as in Example 9 to obtain an inner-wadding type writing instrument (marking pen).

Comparative Example 10

Preparation of Reversibly Thermochromic Aqueous Ink Composition

A reversibly thermochromic aqueous ink composition was obtained by blending 25.0 parts of the reversibly thermochromic microcapsule pigment prepared in Example 10 (colored orange by cooling to −25° C. or lower beforehand), 0.5 part of hydroxyethyl cellulose, 1.0 part of an organic nitrogen sulfur compound [trade name: Hokuside R-150 manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.80 and the surface tension was 39.8 mN/m.

Preparation of Inner-Wadding Type Writing Instrument

The resulting ink composition was contained in a writing instrument in the same manner as in Example 10 to obtain an inner-wadding type writing instrument (marking pen).

Comparative Example 11

Preparation of Reversibly Thermochromic Aqueous Ink Composition

A reversibly thermochromic aqueous ink composition was obtained by blending 25.0 parts of the reversibly thermochromic microcapsule pigment prepared in Example 11 (colored orange by cooling to −30° C. or lower beforehand), 0.5 part of hydroxyethyl 1.0 cellulose, 1.0 part of an organic nitrogen sulfur compound [trade name: Hokuside R-150 manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.90 and the surface tension was 41.0 mN/m.

Preparation of Inner-Wadding Type Writing Instrument

The resulting ink composition was contained in a writing instrument in the same manner as in Example 11 to obtain an inner-wadding type writing instrument (marking pen).

Comparative Example 12

Preparation of Reversibly Thermochromic Aqueous Ink Composition

A reversibly thermochromic aqueous ink composition was obtained by blending 25.0 parts of the reversibly thermochromic microcapsule pigment prepared in Example 12 (colored pink by cooling to −25° C. or lower beforehand), 0.5 part of hydroxyethyl cellulose, 1.0 part of an organic nitrogen sulfur compound [trade name: Hokuside R-150 manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.90 and the surface tension was 41.0 mN/m.

Preparation of Inner-Wadding Type Writing Instrument

The resulting ink composition was contained in a writing instrument in the same manner as in Example 12 to obtain an inner-wadding type writing instrument (marking pen).

Comparative Example 13

Preparation of Reversibly Thermochromic Aqueous Ink Composition

A reversibly thermochromic aqueous ink composition was obtained by blending 25.0 parts of the reversibly thermochromic microcapsule pigment prepared in Example 13 (colored black by cooling to −25° C. or lower beforehand), 0.5 part of hydroxyethyl cellulose, 1.0 part of an organic nitrogen sulfur compound [trade name: Hokuside R-150 manufactured by Hokko Chemical Industry Co., Ltd.], 0.5 part of polyvinyl alcohol, 35.0 parts of glycerin, 0.02 part of a defoaming agent (silicone-based), and 37.98 parts of water.

The pH of the above ink composition was 6.78 and the surface tension was 41.5 mN/m.

Preparation of Direct Liquid Type Writing Instrument

The resulting ink composition was contained in a writing instrument in the same manner as in Example 13 to obtain an inner-wadding type writing instrument (marking pen).

Using the writing instrument obtained in each of the above Examples and Comparative Examples, the following tests were conducted.

Vibration Test

Using the writing instrument obtained in each of Examples 1 to 13 and Comparative Examples 1 to 13, a line having a length of 20 cm was written ten times as ten lines on a writing paper.

Its cap was fitted to the writing instrument used for writing and it was set on a shaker [recipro-shaker manufactured by Taitec Corporation] in an erecting state (the writing front end was upward). After vibration was imparted at 284 rpm for 5 hours in a vertical direction under an environment of 25° C., a line having a length of 20 cm was written ten times as ten lines on a writing paper and the handwriting was compared with the handwriting before the test.

Furthermore, after vibration was imparted for 50 hours in a vertical direction under an environment of 40° C. that is an assumption of long-term passage, a line having a length of 20 cm was similarly written ten times as ten lines on a writing paper and the handwriting was compared with the handwriting before the test.

The results of the vibration test were shown in the following table.

TABLE 1

|  |  | Example | | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 | 13 |
| Vibration test | 25° C., 5 hours | A | A | A | A | A | A | A | A | A | A | A | A | A |
|  | 40° C., 50 hours | A | A | A | A | A | A | A | A | A | A | A | A | A |

TABLE 2

|  |  | Comparative Example | | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 | 13 |
| Vibration test | 25° C., 5 hours | B | B | B | B | B | B | B | B | B | B | B | B | B |
|  | 40° C., 50 hours | B | B | B | B | B | B | B | B | B | B | B | B | B |

The evaluation about the symbols in the table is as follows:

A: disconnection is not observed on the handwriting as compared with the initial one and it has the same color density as that of the initial one;

B: disconnection is observed at the start of writing and the handwriting density is reduced as compared with the initial density.

Aging Test

Four writing instruments obtained in each of Example 8 and Comparative Example 8 were prepared. Using each writing instrument, a line having a length of 20 cm was written ten times as ten lines on a writing paper.

Its cap was fitted to the writing instrument used for writing and it was allowed to stand in an erecting state (the writing front end was upward) at 25° C. for 30 days for first writing instrument, at 25° C. for 60 days for second writing instrument, at 50° C. for 30 days for third writing instrument, and at 50° C. for 60 days for fourth writing instrument. Thereafter, in each case, a line having a length of 20 cm was written ten times as ten lines on a writing paper and the handwriting was compared with the handwriting before the test.

The results of the aging test are shown in the following table.

TABLE 3

|  |  | 50° C., 30 days | 50° C., 60 days | 25° C., 30 days | 25° C., 60 days |
|---|---|---|---|---|---|
| Aging test | Example 8 | A | A | A | A |
|  | Comparative Example 8 | B | B | B | B |

The evaluation about the symbols in the table is as follows:

A: disconnection is not observed on the handwriting as compared with the initial one and it has the same color density as that of the initial one;

B: disconnection is observed at the start of writing and the handwriting density is reduced as compared with the initial density.

Writing Feel Test

Using each of the writing instruments obtained in Examples 1 to 13, 15 circles in one line were written 30 times as 30 lines on a writing paper and writing feel was compared.

Incidentally, the writing feel test was performed by 5 persons of Test Persons A to E.

The results of the writing feel test are shown in the following table.

TABLE 4

|  |  | Example | | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 | 13 |
| Writing test | Test person A | B | B | B | B | B | B | B | B | B | A | S | A | A |
|  | Test person B | B | B | B | B | B | B | B | B | A | A | S | A | A |
|  | Test person C | B | B | B | B | B | B | B | B | A | A | S | A | S |
|  | Test person D | B | B | B | B | B | B | B | B | A | S | S | A | S |
|  | Test person E | B | B | B | B | B | B | B | B | A | A | S | A | A |

The evaluation about the symbols in the table is as follows:

S: very smooth writing can be performed;

A: smooth writing can be performed;

B: writing is performed with usual writing feel.

Example 14

Preparation of Reversibly Thermochromic Microcapsule Pigment

A microcapsule pigment suspension which contained a reversibly thermochromic composition having a color-memory property and composed of 3.0 parts of 1,3-dimethyl-6-diethylaminofluorane as the component (A), 3.0 parts of 4,4'-(2-ethylhexane-1,1-diyl)diphenol and 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversibly thermochromic microcapsule pigment.

The average particle diameter of the above microcapsule pigment is 2.5 μm, the complete decoloring temperature is 60° C., and the complete coloring temperature is −20° C. The pigment changes color from orange to colorless through a change in temperature.

Preparation of Reversibly Thermochromic Aqueous Ink Composition

A reversibly thermochromic aqueous ink composition was obtained by blending 25.0 parts of the above microcapsule pigment (colored orange by cooling to −20° C. or lower beforehand), 0.5 part of a comb type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd., a mixture of 2-methyl-4-isothiazolin-3-one and 5-chloro-2-methyl-4-isothiazolin-3-one], 0.5 part of polyvinyl alcohol, 35.0 parts of glycerin, 0.02 part of a defoaming agent (silicone-based), and 37.98 parts of water.

The pH of the above ink composition was 7.00 and the surface tension was 39.8 mN/m.

Preparation of Inner-Wadding Type Writing Instrument

An ink occlusion body, in which a polyester sliver was coated with a synthetic resin film, was impregnated with the above ink composition, received in an axle body made of a polypropylene resin, and assembled with a resin processed pen body (cannonball type) of polyester fiber on the front end of the axle body via a holder in the connected state, and a cap was then fitted thereto, whereby an inner-wadding type writing instrument (marking pen) was obtained.

Preparation of Writing Instrument Set

The above inner-wadding type writing instrument and a rectangular frictional body made of an SEBS resin were combined to obtain a writing instrument set.

Using the above writing instrument, an orange letter (handwriting) was formed by writing on a sheet of paper.

The above handwriting showed orange at room temperature (25° C.), but the letter decolored and became colorless when rubbed using the frictional body. This state was maintained under room temperature. When the sheet of paper was cooled to −20° C. or less, the color was returned to original orange and the discoloration behavior was reproduced repeatedly.

While the present invention has been described in detail and with reference to the specific embodiments thereof, it will be apparent to one skilled in the art that various changes and modifications can be made therein without departing from the spirit and scope thereof.

The present application is based on Japanese Patent Application No. 2009-189038 filed on Aug. 18, 2009, and the entire contents thereof are incorporated herein by reference.

Description Of Reference Numerals And Signs $t_1$ Complete coloring temperature of a heat-decoloring type reversibly thermochromic microcapsule pigment
$t_2$ Coloring starting temperature of a heat-decoloring type reversibly thermochromic microcapsule pigment
$t_3$ Decoloring starting temperature of a heat-decoloring type reversibly thermochromic microcapsule pigment
$t_4$ Complete decoloring temperature of a heat-decoloring type reversibly thermochromic microcapsule pigment
$T_1$ Complete decoloring temperature of a heat-coloring type reversibly thermochromic microcapsule pigment
$T_2$ Decoloring starting temperature of a heat-coloring type reversibly thermochromic microcapsule pigment
$T_3$ Coloring starting temperature of a heat-coloring type reversibly thermochromic microcapsule pigment
$T_4$ Complete coloring temperature of a heat-coloring type reversibly thermochromic microcapsule pigment
ΔH Hysteresis width
1 Writing instrument
2 Ink occlusion body
3 Pen body
4 Axle body
5 Holder
6 Cap
7 Frictional member
8 Ink
9 Stirring body
10 Valve mechanism

The invention claimed is:

1. A reversibly thermochromic aqueous ink composition comprising:
   water,
   a water-soluble organic solvent,
   a reversibly thermochromic microcapsule pigment which contains a reversibly thermochromic composition comprising:
      (A) an electron donating coloring organic compound,
      (B) an electron accepting compound, and
      (C) a reaction medium which determines temperature at which color reactions between the components (A) and (B) occur,
   a comb type polymer dispersant having carboxyl groups on its side chains,
   an organic nitrogen sulfur compound, and
   a water-soluble resin.

2. The reversibly thermochromic aqueous ink composition according to claim 1, wherein the organic nitrogen sulfur compound is at least one compound selected from the group consisting of 2-(4-thiazoyl)-benzimidazole, 2-(thiocyanatemethylthio) -1,3-benzothiazole, 2-methyl-4-isothiazolin-3-one, 5-chloro-2-methyl-4-isothiazolin -3-one.

3. The reversibly thermochromic aqueous ink composition according to claim 1, wherein the mass ratio of the comb type polymer dispersant having carboxyl groups on its side chains to the organic nitrogen sulfur compound is 1:1 to 1:10.

4. The reversibly thermochromic aqueous ink composition according to claim 1, wherein the pH of the ink composition falls within a range of 3 to 7.

5. The reversibly thermochromic aqueous ink composition according to claim 4, wherein the water-soluble resin is soluble when the pH of the ink composition falls within a range of 3 to 7.

6. The reversibly thermochromic aqueous ink composition according to claim 1, wherein the surface tension of the ink composition falls within a range of 25 to 45 mN/m.

7. A writing instrument wherein the reversibly thermochromic aqueous ink composition according to claim 1 is received in an axle body and which comprises a pen body delivering the ink composition in the axle body.

8. The writing instrument according to claim 7, wherein the rear end of the pen body comes into contact with an ink occlusion body containing a fiber assembly received in the axle body and the ink occlusion body is impregnated with the ink composition.

9. The writing instrument according to claim 7, wherein the pen body is a marking pen body.

10. The writing instrument according to claim 7, which comprises a frictional member.

11. A writing instrument set comprising the writing instrument according to claim 7 and a frictional body.

* * * * *